United States Patent
Jeong

(10) Patent No.: US 12,437,819 B2
(45) Date of Patent: Oct. 7, 2025

(54) MEMORY DEVICE WITH CURRENT MEASURE FOR CALCULATING INHIBIT CELLS

(71) Applicant: SK hynix Inc., Icheon-si (KR)

(72) Inventor: Seung Geun Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 218 days.

(21) Appl. No.: 18/317,670

(22) Filed: May 15, 2023

(65) Prior Publication Data
US 2024/0161841 A1    May 16, 2024

(30) Foreign Application Priority Data

Nov. 15, 2022  (KR) .......................... 10-2022-0152833

(51) Int. Cl.
*G11C 16/34*   (2006.01)
*G11C 16/12*   (2006.01)
*G11C 16/24*   (2006.01)

(52) U.S. Cl.
CPC .......... *G11C 16/3459* (2013.01); *G11C 16/12* (2013.01); *G11C 16/24* (2013.01)

(58) Field of Classification Search
CPC ..... G11C 16/3459; G11C 16/12; G11C 16/24; G11C 11/5628; G11C 16/0483; G11C 16/26; G11C 16/10; G11C 5/147; G11C 7/1084; G11C 7/12; G11C 8/08; G11C 16/30; G01R 19/16571
See application file for complete search history.

(56) References Cited

U.S. PATENT DOCUMENTS

| | | | |
|---|---|---|---|
| 10,489,700 B1* | 11/2019 | Asnaashari | G06N 3/049 |
| 2008/0174297 A1* | 7/2008 | Jang | G11C 29/02 |
| | | | 702/117 |
| 2021/0272639 A1* | 9/2021 | Dhotre | G06F 9/542 |
| 2022/0084597 A1* | 3/2022 | Mun | G11C 11/5671 |

FOREIGN PATENT DOCUMENTS

| | | |
|---|---|---|
| KR | 101119371 B1 | 3/2012 |
| KR | 101211840 B1 | 12/2012 |

* cited by examiner

*Primary Examiner* — Amir Zarabian
*Assistant Examiner* — Bradley S Coon
(74) *Attorney, Agent, or Firm* — WILLIAM PARK AND ASSOCIATES LTD.

(57) ABSTRACT

The present technology includes a memory device and a method of operating the same. The memory device includes a memory block, page buffers connected to memory cells through bit lines and configured to apply a program allowable voltage or a program inhibit voltage to the bit lines, a current measurer configured to output a total current value of the bit lines according to a sensing voltage measured from the bit lines, and a logic circuit configured to control the voltage generator and the page buffers to calculate the number of inhibit cells according to the total current value and omit a verify operation of a program loop or perform the verify operation of the program loop according to the number of the inhibit cells.

26 Claims, 13 Drawing Sheets

[fast chip]

| #LP | 1LP | 2LP | 3LP | 4LP | 5LP | 6LP | 7LP | 8LP |
|---|---|---|---|---|---|---|---|---|
| P1 | O | O | O | O | | | | |
| P2 | blind | | | O | O | O | O | O |
| P3 | blind | | | | | O | O | O |
| P4 | blind | | | | | | | O |

[slow chip]

| #LP | 1LP | 2LP | 3LP | 4LP | 5LP | 6LP | 7LP | 8LP |
|---|---|---|---|---|---|---|---|---|
| P1 | ○ | ○ | ○ | ○ | | | | |
| P2 | blind | | | blind | | ○ | ○ | ○ |
| P3 | blind | | | | | blind | ○ | ○ |
| P4 | blind | | | | | | | ○ |

142  144

MEMORY DEVICE WITH CURRENT MEASURE FOR CALCULATING INHIBIT CELLS

CROSS-REFERENCE TO RELATED APPLICATION

The present application claims priority under 35 U.S.C. § 119(a) to Korean patent application number 10-2022-0152833, filed on Nov. 15, 2022, in the Korean Intellectual Property Office, the entire disclosure of which is incorporated herein by reference.

BACKGROUND

1. Technical Field

The present disclosure relates to a memory device and a method of operating the same, and more particularly, to a memory device having a three-dimensional structure and a method of operating the same.

2. Related Art

A memory device may include a memory cell array in which data is stored and a peripheral circuit configured to perform a program, read, or erase operation.

The memory cell array may include a plurality of memory blocks, and each of the plurality of memory blocks may include a plurality of memory cells.

The peripheral circuit may include a control circuit that controls the entire operation of the memory device in response to a command transmitted from an external controller, and circuits configured to execute the program, read, or erase operation under the control of the control circuit.

The memory device may be configured to perform the program, read, or erase operation in response to a command that is output from the controller. Recently, in order to increase the storage capacity of the memory device, the program operation is performed in a multi-level cell method that stores data configured of a plurality of bits in one memory cell. In the program operation of the multi-level cell method, a plurality of program loops may be performed to program memory cells to various target levels. Since a program operation time is the time it takes for a plurality of programs to be performed, the time required for the plurality of program loops needs to be reduced in order to reduce an operation time of the memory device.

SUMMARY

According to an embodiment of the present disclosure, a memory device includes a memory block including memory cells, a voltage generator connected to the memory cells through word lines and configured to apply a program voltage or a verify voltage to the word lines, a plurality of page buffers connected to the memory cells through a plurality of bit lines and configured to apply a program allowable voltage or a program inhibit voltage to the plurality of bit lines, a current measurer configured to output a total current value of the plurality of bit lines according to a sensing voltage measured from the plurality of bit lines, and a logic circuit configured to control the voltage generator and the page buffers to calculate the number of inhibit cells according to the total current value and configured to omit a verify operation of a program loop or perform the verify operation of the program loop according to the number of the inhibit cells.

According to an embodiment of the present disclosure, a method of operating a memory device includes applying a program allowable voltage to first bit lines connected to selected memory cells and applying a program inhibit voltage to second bit lines connected to inhibit cells, measuring a total current value of the first and second bit lines, determining a verify mode according to the total current value, applying a program voltage to a word line connected to the selected memory cells, and performing or omitting a verify operation of the selected memory cells according to the verify mode.

According to an embodiment of the present disclosure, a method of operating a memory device includes precharging unselected bit lines, among the unselected bit lines and selected bit lines, measuring a total current value of the unselected and second selected bit lines, calculating a value by dividing the total current value by a current flowing through one bit line, among the unselected bit lines, and calculating the number of inhibit cells connected to the unselected bit lines by multiplying the value by a total number of threshold voltage distributions that memory cells are able to have.

DETAILED DESCRIPTION

Specific structural or functional descriptions disclosed below are exemplified to describe an embodiment according to the concept of the present disclosure. The embodiment according to the concept of the present disclosure is not construed as being limited to the embodiments described below and may be variously modified and replaced with other equivalent embodiments.

Hereinafter, terms such as first and second may be used to describe various components, but the components are not limited by the terms. The terms are used for the purpose of distinguishing one component from another component.

An embodiment of the present disclosure provides a memory device and a method of operating the same capable of reducing a time required for a program operation of the memory device.

According to the present technology, a time required for a program operation performed in a memory device may be reduced.

Figure 1:
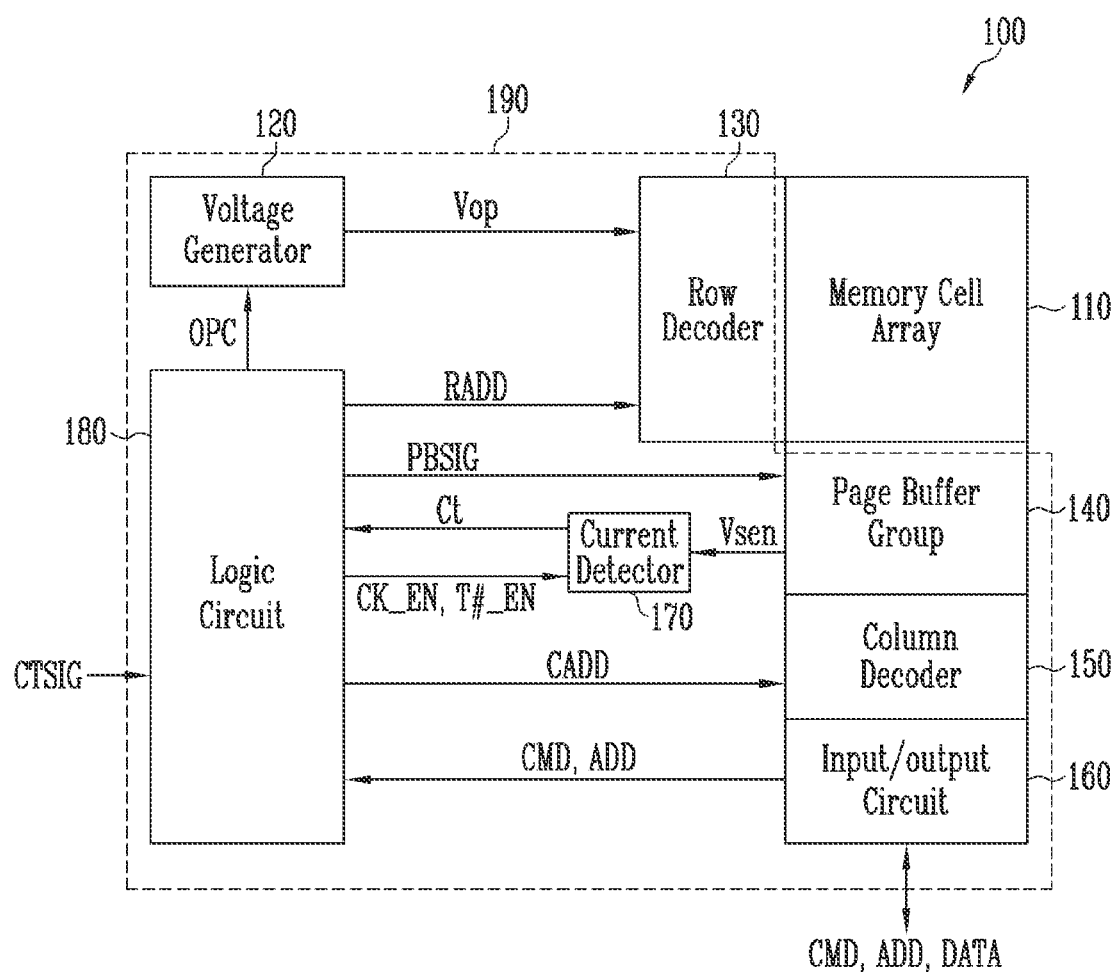
FIG. 1 is a diagram illustrating a memory device.

FIG. 1 is a diagram illustrating a memory device.

Referring to FIG. 1, the memory device 100 may include a memory cell array 110 in which data is stored, a peripheral circuit 190 performing a program, read, or erase operation, and a logic circuit controlling the peripheral circuit 190.

The memory cell array 110 may include a plurality of memory blocks in which data is stored. Each of the memory blocks may include a plurality of memory cells, and the memory cells may be implemented in a two-dimensional structure in which the memory cells are arranged in parallel on a substrate or a three-dimensional structure in which the memory cells are stacked in a vertical direction on the substrate.

The peripheral circuit 190 may include a voltage generator 120, a row decoder 130, a page buffer group 140, a column decoder 150, an input/output circuit 160, and a current detector (or a current measurer) 170.

The voltage generator 120 may generate and output operation voltages Vop required for various operations in response to an operation code OPC. For example, the voltage generator 120 may generate and output a program voltage, a verify voltage, a read voltage, a pass voltage, an erase voltage, and the like.

The row decoder 130 may select one memory block from among the memory blocks included in the memory cell array 110 according to a row address RADD and transmit the operation voltages Vop to the selected memory block.

The page buffer group 140 may be connected to the memory cell array 110 through bit lines. For example, the page buffer group 140 may include page buffers connected to the respective bit lines. The page buffers may simultaneously operate in response to page buffer control signals PBSIG and temporarily store data during the program or read operation. To this end, each of the page buffers may include a plurality of latches for temporarily storing data. The number of latches may vary according to the program method. For example, the page buffers may be designed differently according to the number of bits that may be stored in one memory cell and may be described differently according to the number of verify voltages used during a verify operation. In addition, the verify voltages may be used to determine various threshold voltages of memory cells to be programmed with the same target voltage.

The column decoder 150 may transmit data DATA between the input/output circuit 160 and the page buffer group 140 according to a column address CADD.

The input/output circuit 160 may be connected to the controller (not shown) through input/output lines IO. The input/output circuit 160 may input/output a command CMD, an address ADD, and the data DATA through the input/output lines IO. For example, the input/output circuit 160 may transmit the command CMD and the address ADD received through the input/output lines IO to the logic circuit 180 and may transmit the data DATA received through the input/output lines IO to the column decoder 150. The input/output circuit 160 may output the data DATA received from the column decoder 150 to an external device through the input/output lines IO.

The current detector 170 may be configured to measure a total current value Ct of the bit lines according to a sensing voltage Vsen sensed from the page buffers during the program operation.

The logic circuit 180 may be configured to output the operation code OPC, the row address RADD, the page buffer control signals PBSIG, and the column address CADD in response to the command CMD, the address ADD, and the total current value Ct. For example, the logic circuit 180 may be configured of software for executing the program, read, or erase operation in response to the command CMD, the address ADD, and the total current value Ct and may be configured of hardware for outputting the operation code OPC, the row address RADD, the page buffer control signals PBSIG, and the column address CADD under the control of the software.

The logic circuit 180 may calculate the number of inhibit cells according to the total current value Ct that is output from the current detector 170 and may change a verify mode according to the number of inhibit cells. The inhibit cells may be unselected memory cells. The unselected memory cells may be cells, among memory cells included in a selected page, maintained in an erase state or cells of which program has been completed. Specifically, describing a method of changing the verify mode, the logic circuit 180 may output a check enable signal CK_EN and a targeting enable signal T #_EN to the current detector 170 in order to measure a current of the bit lines according to a result of a verify operation performed in a current program loop. Subsequently, when receiving the total current value Ct of the bit lines from the current detector 170, the logic circuit 180 may determine the current program loop mode. For example, the logic circuit 180 may select a blind mode in which a selected verify operation is omitted or a normal mode in which the selected verify operation is performed. When the verify mode is determined, the logic circuit 180 may output the operation code OPC according to the selected verify mode. For example, in the blind mode, the logic circuit 180 may output the operation code OPC and the page buffer control signals PBSIG so that at least one verify operation is omitted in the current program loop. In the normal mode, the logic circuit 180 may output the operation code OPC and the page buffer control signals PBSIG so that all verify operations set in the current program loop are performed.

Figure 2:
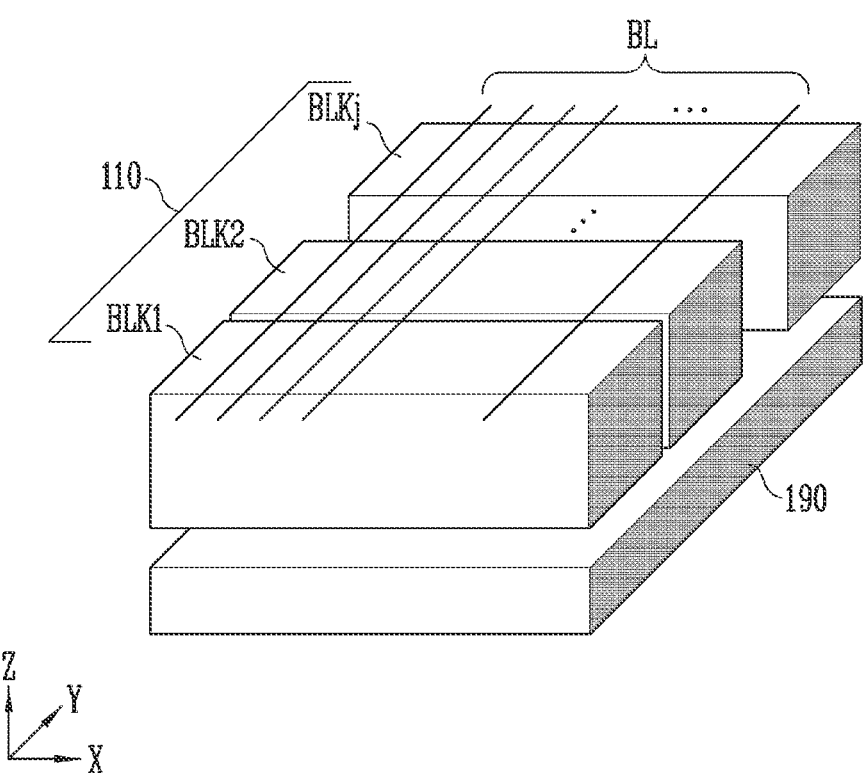
FIG. 2 is a diagram illustrating a disposition of a memory cell array and a peripheral circuit.

FIG. 2 is a diagram illustrating a disposition of the memory cell array and the peripheral circuit.

Referring to FIG. 1 and FIG. 2, the memory device 100 may include the peripheral circuit 190 and the memory cell array 110. The peripheral circuit 190 may be disposed on a substrate (not shown), and the memory cell array 110 may be disposed on the peripheral circuit 190. The memory cell array 110 may include first to j-th memory blocks BLK1 to BLKj. A plurality of bit lines BL may be disposed on the first to j-th memory blocks BLK1 to BLKj.

The plurality of bit lines BL may be arranged to be spaced apart from each other along an X direction and may extend along a Y direction. The first to j-th memory blocks BLK1 to BLKj may be arranged to be spaced apart from each other along the Y direction. Since the first to j-th memory blocks BLK1 to BLKj may be configured identically to each other, the first memory block BLK1 is specifically described as an example as follows.

Figure 3:
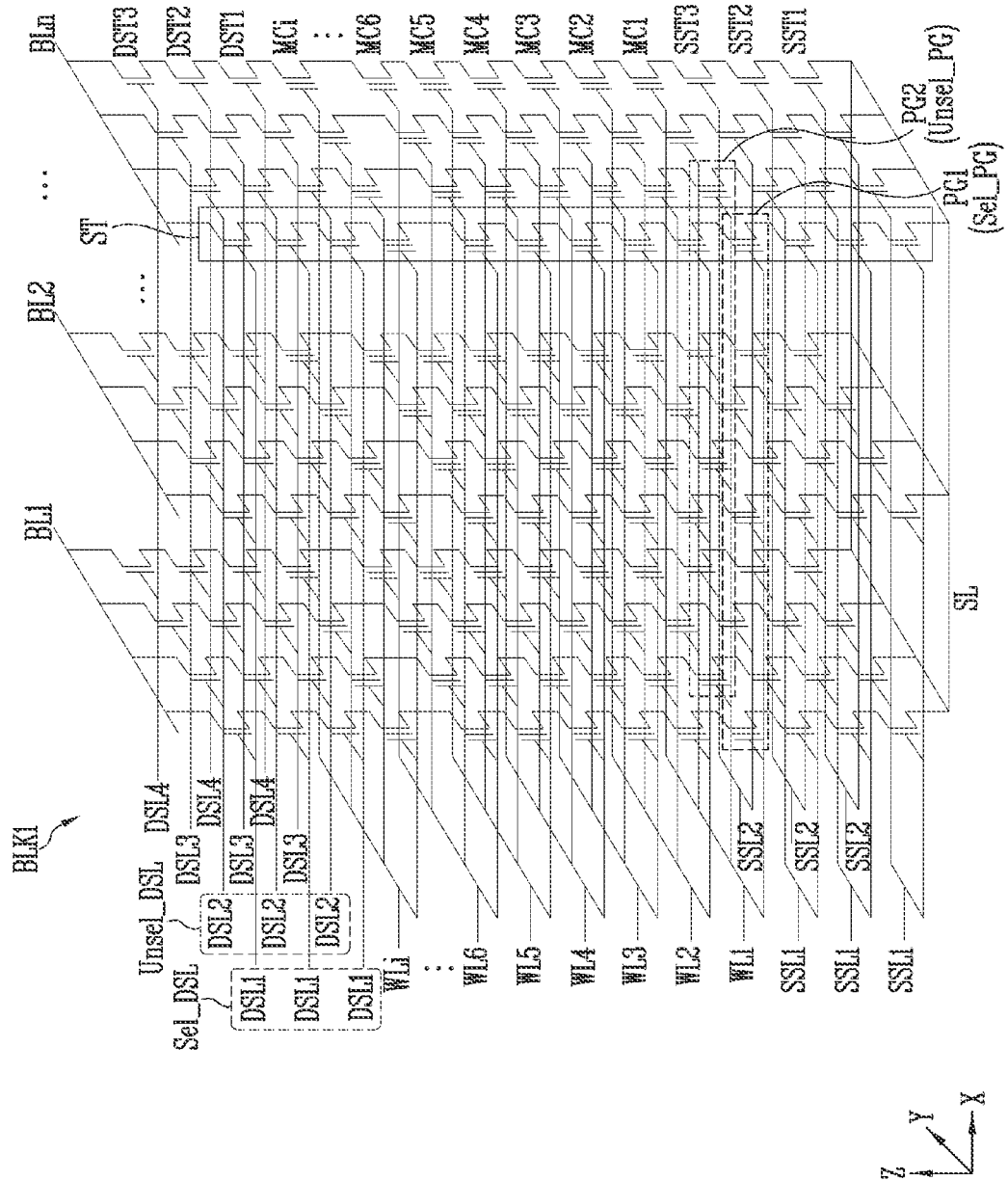
FIG. 3 is a circuit diagram illustrating a memory block.

FIG. 3 is a circuit diagram illustrating the memory block.

Referring to FIG. 3, the first memory block BLK1 includes strings ST connected between first to n-th bit lines BL1 to BLn and a source line SL. Since the first to n-th bit lines BL1 to BLn extend along the Y direction and are arranged to be spaced apart from each other along the X direction, the strings ST may also be arranged to be spaced apart from each other along the X and Y directions. For example, the strings ST may be connected between the first bit line BL1 and the source line SL, and the strings ST may be arranged between the second bit line BL2 and the source line SL. In such a method, the strings ST may be arranged between the n-th bit line BLn and the source line SL. The strings ST may extend along a Z direction.

Describing any one string ST among the strings ST connected to the n-th bit line BLn as an example, the string ST may include first to third source select transistors SST1 to SST3, first to i-th memory cells MC1 to MCi, and first to third drain select transistors DST1 to DST3. Since the first memory block BLK1, shown in FIG. 3, is a diagram illustrating a structure of the memory block, the number of source select transistors, memory cells, and drain select transistors included in the strings ST may be changed according to the memory device.

Gates of the first to third source select transistors SST1 to SST3 included in different strings may be connected to first and second source select lines SSL1 and SSL2, gates of the first to i-th memory cells MC1 to MCi may be connected to first to i-th word lines WL1 to WLi, and gates of the first to third drain select transistors DST1 to DST3 may be connected to first to fourth drain select lines DSL1 to DSL4.

Specifically describing the lines connected to the first memory block BLK1, the first to third source select transistors SST1 to SST3 arranged along the X and Z directions may be connected to the same source select line, and the first to third source select transistors SST1 to SST3 arranged along the Y direction may be connected to separate source select lines. For example, a portion of the first source select transistors SST1 arranged in the Y direction may be connected to the first source select line SSL1, and the rest of the first source select transistors SST1 may be connected to the second source select line SSL2. The second source select line SSL2 and the first source select line SSL1 may be separate lines. Therefore, a voltage applied to the first source select line SSL1 may be different from a voltage applied to the second source select line SSL2. Similarly, a portion of the second and third source select transistors SST2 and SST3 may be connected to the first source select line SSL1, and the rest of the second and third source select transistors SST2 and SST3 may be connected to the second source select line SSL2.

Among the first to i-th memory cells MC1 to MCi, memory cells formed on the same layer may be connected to the same word line. For example, the first memory cells MC1 included in the different strings ST may be commonly connected to the first word line WL1, and the i-th memory cells included in the different strings ST may be commonly connected to the i-th word line WLi. A group of memory cells included in different strings ST and connected to the same word line becomes a page (PG). For example, in the strings ST connected to the first drain select line DSL1, the first memory cells MC1 may become a first page PG1, and in the strings ST connected to the second drain select line DSL2, the first memory cells MC1 may become a second page PG2.

The first to third drain select transistors DST1 to DST3 included in different strings ST may be connected to separate drain select lines. Specifically, each of the first to third drain select transistors DST1 to DST3 arranged along the X direction may be connected to the same drain select line, and the first to third drain select transistors DST1 to DST3 arranged along the Y direction may be connected to separate drain select lines. For example, a portion of the first drain select transistors DST1 may be connected to the first drain select line DSL1, and the rest of the first drain select transistors DST1 may be connected to the second drain select line DSL2. The second drain select line DSL2 and the first drain select line DSL1 may be separate lines. Therefore, a voltage applied to the first drain select line DSL1 may be different from a voltage applied to the second drain select line DSL2. Similarly, a portion of the second drain select transistors DST2 and a portion of the third drain select transistors DST3 may be connected to the first drain select line DSL1, and the rest of the second drain select transistors DST2 and the rest of the third drain select transistors DST3 may be connected to the second drain select line DSL2.

During the program or the read operation, one of the strings ST may be selected by a selected drain select line Sel_DSL, among the first to fourth drain select lines DSL1 to DSL4. Different pages may be determined by a voltage applied to the drain select lines. For example, when the first drain select line DSL1 is designated as the selected drain select line Sel_DSL and the second drain select line DSL2 is designated as unselected drain select line Unsel_DSL, the first page PG1 may become a selected page Sel_PG, and the second page PG2 may become an unselected page Unsel_PG. Strings ST connected to the selected page Sel_PG may become selected strings. The selected page may include memory cells coupled to a selected word line to which the program voltage is applied, and the unselected page may include memory cells coupled to an unselected word line to which the pass voltage is applied.

Figure 4:
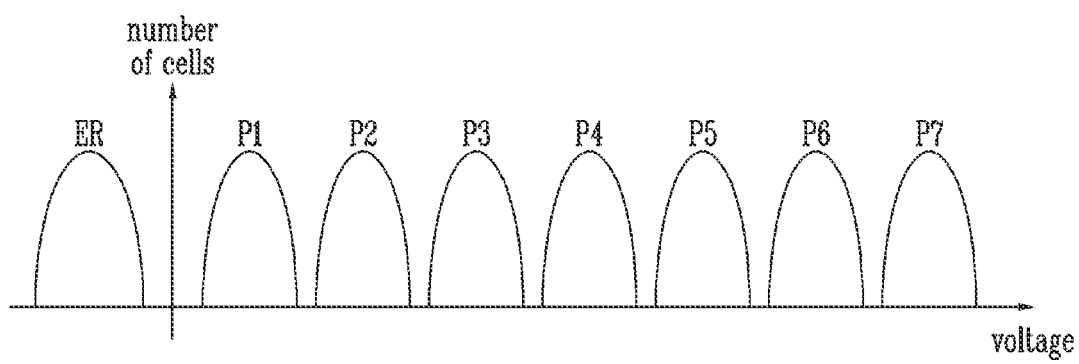
FIG. 4 is a diagram illustrating a threshold voltage distribution of memory cells.

FIG. 4 is a diagram illustrating a threshold voltage distribution of the memory cells.

Referring to FIG. 4, as an example, a program operation of a triple level cell method, among the program operations of the multi-level cell method, is described as follows.

In a triple level cell method, three bits of data may be stored in one memory cell. The memory cells may be maintained as an erase state ER or may be programmed to any one state, among first to seventh program states P1 to P7, according to the three bits of data. Since threshold voltages of memory cells selected through the program operation is required to be divided into the first to seventh program states P1 to P7, verify voltages corresponding to the first to seventh program states P1 to P7 may be used in the program operation, and the verify voltages may be used in an verify operation performed in the program operation. For example, a first verify voltage between the erase state ER and the first program state P1 may be used to distinguish the erase state ER from the first program state P1, and a second verify voltage between the first and second program states P1 and P2 may be used to distinguish the first program state P1 from the second program state P2. In such a method, verify operations using at least seven verify voltages may be performed to distinguish the erase state ER and the first to seventh program states P1 to P7 from each other.

During the program operation, all speeds at which the memory cells are programmed are required to be the same, but in practice, a difference may occur in speeds at which the memory cells are programming due to an electrical difference between the memory cells. Therefore, even though the same program voltage is applied to the memory cells, the threshold voltages of the memory cells may be changed to different levels. Due to this, verify operations using a plurality of verify voltages may be performed in the same program loop. As the number of times the verify operations are performed increases, the time required for the program operation may increase. In the present embodiment, the time required for the program operation may be reduced by searching for a verify voltage that can be omitted in a program loop and omitting the corresponding verify operation, i.e., performing a blind verify operation.

Figure 5:
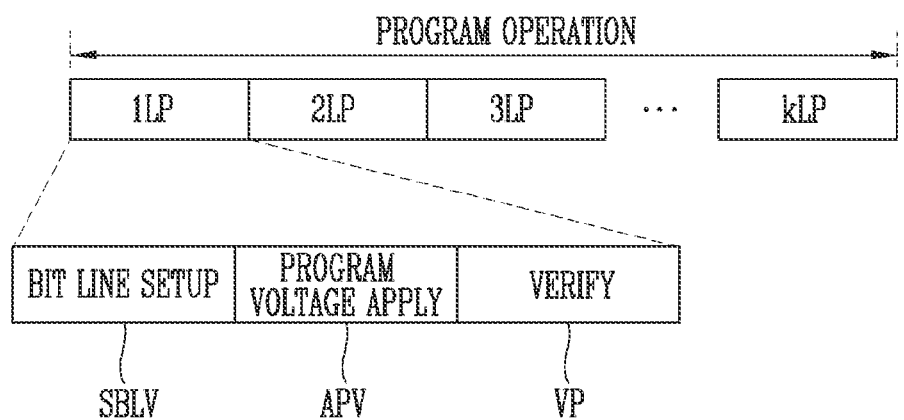
FIG. 5 is a diagram illustrating a program operation performed on a selected page.

FIG. 5 is a diagram illustrating the program operation performed on the selected page.

Referring to FIG. 5, a plurality of memory cells may be included in the selected page, and selected memory cells among the plurality of memory cells may be programmed to have a threshold voltage distribution of various levels. In order to increase a threshold voltage of the memory cells, a plurality of program loops may be performed in the program operation. For example, in the program operation of the selected page, first to k-th program loops 1LP to kLP may be performed. Here, k is a positive integer and may vary according to a program speed of the selected page. The program speed of the selected page may be a program speed of the memory cells included in the selected page. Therefore, when the memory cells included in the selected page are slow cells, the program speed of the selected page may be decreased, and when the memory cells are fast cells, the program speed of the selected page may be increased.

Each of the first to k-th program loops 1LP to kLP may include a bit line setup step SBLV, a program voltage apply step APV, and a verify step VP. Among them, the verify step VP may be omitted in some program loops.

The bit line setup step SBLV may be a step of applying the program allowable voltage or the program inhibit voltage to the bit lines. In the present embodiment, a step of measuring the current of the bit lines may be added in the bit line setup step SBLV. For example, in the bit line setup step SBLV, the program allowable voltage may be applied to selected bit lines connected to selected memory cells, and the program inhibit voltage may be applied to unselected bit lines connected to unselected memory cells. For example, the program allowable voltage may be 0V, and the program inhibit voltage may be a positive voltage that is higher than 0V. For example, the program inhibit voltage may be a power voltage.

The program voltage apply step APV may be a step of increasing a threshold voltage of the selected memory cells. For example, the program voltage may be applied to selected word line connected to the selected memory cells. An electron may flow into the selected memory cells due to a voltage difference between the program voltage applied to the selected memory cells and the program allowable voltage, and thus, the threshold voltage of the selected memory cells may be increased. At this time, since the difference between the program voltage and the program inhibit voltage is low in the unselected memory cells, the threshold voltage of the unselected memory cells may be maintained as a previous level without increasing. Since the program allowable voltage of 0V is applied to the selected bit lines connected to the selected memory cells, the current of the selected bit lines may be 0. Since the program inhibit voltage of the positive voltage is applied to the unselected bit lines connected to the unselected memory cells, a current may be generated in the unselected bit lines. Therefore, a total current value of the bit lines may be a sum of all currents of the unselected bit lines and may vary according to the number of unselected memory cells. Since the number of unselected memory cells included in the selected page increases as the program operation progresses, the total current value of the bit lines may also increase as the program operation progresses. Since the unselected memory cells may be cells maintained at the erase state and memory cells of which a threshold voltage is increased to a target level, the unselected memory cells may be defined as inhibit cells in the present embodiment.

The verify step VP may be a step of determining whether the threshold voltages of the selected memory cells have increased to the target level. For example, in the verify step VP, a verify operation using a selected verify voltage corresponding to the target level of the selected memory cells may be performed. In the present embodiment, a blind period of the verify step VP may be determined according to a verify mode determined in the bit line setup step SBLV. The blind period may be a period in which a verify operation using the selected verify voltage is omitted. For example, when verify operations using a plurality of verify voltages are performed in one program loop, some verify operations may be omitted according to the verify mode.

Figure 6:
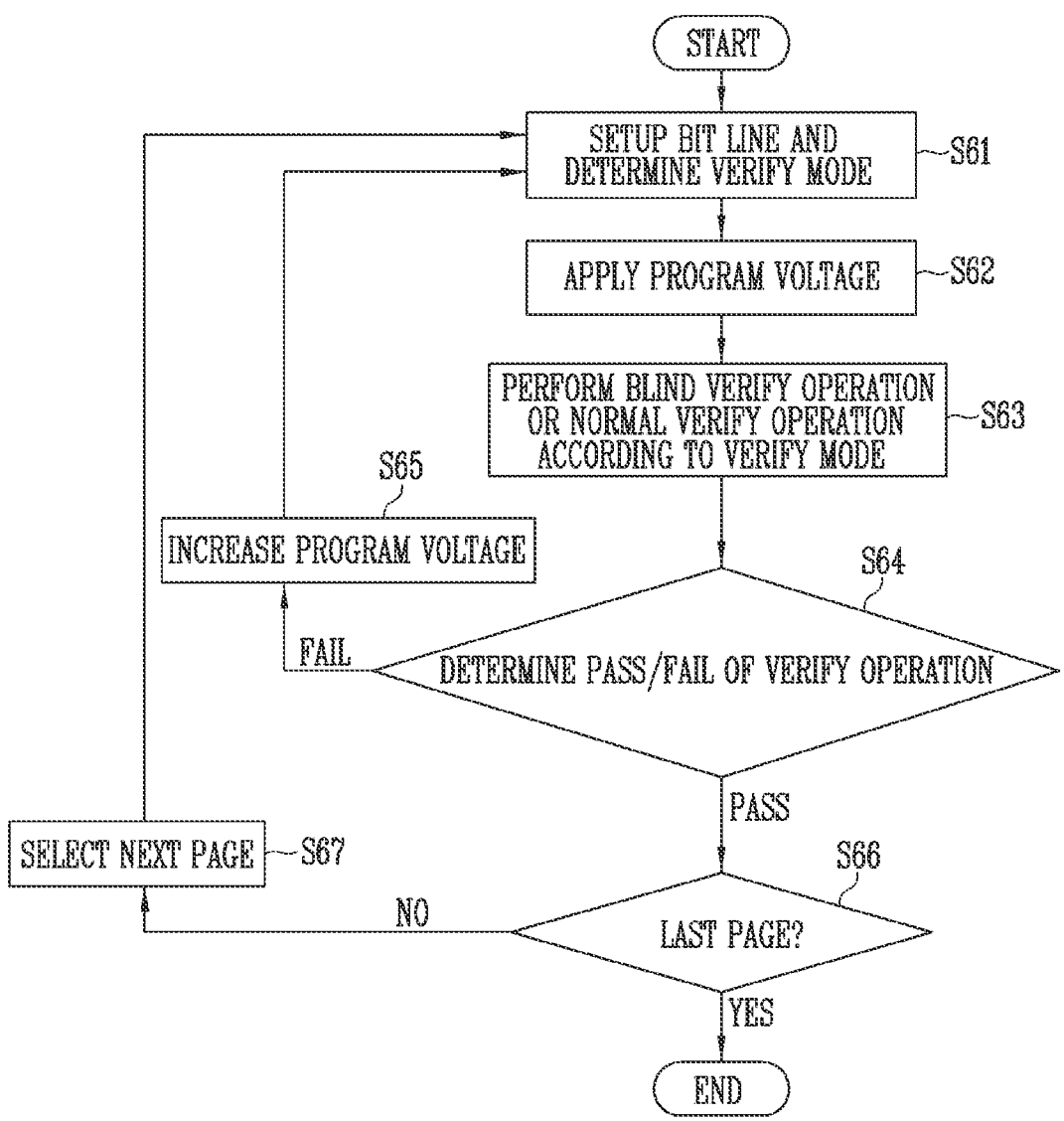
FIG. 6 is a flowchart illustrating a program operation according to an embodiment of the present disclosure.

FIG. 6 is a flowchart illustrating a program operation according to an embodiment of the present disclosure.

Referring to FIG. 6, a bit line setup and verify mode determination step (S61) may be performed. In the bit line setup and verify mode determination step (S61), the program allowable voltage or the program inhibit voltage may be applied to the bit lines, and the verify mode may be determined. For example, the selected page may include the selected memory cells and the inhibit cells. The selected memory cells may be cells to be programmed, and the inhibit cells may be cells that are not to be programmed. In other words, the selected memory cells may be cells of which a threshold voltage is increased, and the inhibit cells may be cells of which a threshold voltage is not increased and maintained. In the bit line setup and verify mode determination step (S61), the program allowable voltage may be applied to the bit lines connected to the selected memory cells, and the program inhibit voltage may be applied to the bit lines connected to the inhibit cells. For example, the program allowable voltage may be 0V, and the program inhibit voltage may be a positive voltage that is higher than the program allowable voltage.

When the program inhibit voltage is applied to the bit lines connected to the inhibit cells, since a current is generated in the bit lines to which the program inhibit voltage is applied, at this time, a total current value flowing through the bit lines may be measured. In the present embodiment, the number of inhibit cells may be calculated according to the total current value of the bit lines, and the verify mode may be determined according to the number of inhibit cells. For example, when the number of inhibit cells is equal to or less than a reference number, the blind mode in which the selected verify voltage is omitted may be set, and when the number of inhibit cells is greater than the reference number, the normal mode in which the selected verify voltage is used may be set.

When the verify mode is determined, a step of applying a program voltage Vpgm to a selected word line Sel_WL (S62) may be performed. For example, a plurality of pages may be included in the selected memory block, and a plurality of word lines may be connected to memory cells included in the plurality of pages. Since the program operation is performed on the selected page, the program voltage Vpgm may be applied to the selected word line Sel_WL connected to the selected page. At this time, a turn off voltage may be applied to the unselected drain select lines, a turn on voltage may be applied to the selected drain select line and source select lines, and the pass voltage may be applied to the unselected word lines. For example, the turn on voltage may be a voltage for turning on the source or drain select transistors and may be set to a positive voltage that is higher than 0V. For example, the turn on voltage may be set to the power voltage. The turn off voltage may be a voltage for turning off the source or drain select transistors and may be set to 0V or a negative voltage that is lower than 0V. The pass voltage may be a voltage for turning on the memory cells included in the unselected pages and may be set to a positive voltage that is higher than 0V. For example, the pass voltage may be set to a positive voltage that is higher than the power voltage.

When the program voltage Vpgm is applied to the selected word line Sel_WL during a predetermined time, a blind verify operation or a normal verify operation may be performed according to the verify mode determined in step S61 (S63). For example, when the verify mode is determined to be the blind mode in step S61, the blind verify operation may be performed in step S63. When the verify mode is determined to be the normal mode in step S61, the normal verify operation may be performed in step S63. In the blind verify operation, the verify operation using the selected verify voltage may be omitted, and in the normal verify operation, the verify operation using the selected verify voltage may be performed. In the normal verify operation, all bit lines or the selected bit lines may be precharged with a positive voltage, and the selected verify voltage may be applied to the selected word line Sel_WL. At this time, the turn on voltage may be applied to the source and drain select lines, and the pass voltage may be applied to the unselected word lines connected to the unselected pages.

Subsequently, a step of determining a pass or a fail of the verify operation performed in step S63 may be performed (S64). When the verify operation performed in step S63 does not exist or when memory cells having a threshold voltage that is lower than the target level are detected in the performed verify operation, the verify operation may be processed as 'FAIL' in step S64. In the verify operation performed in step S63, when it is determined that the threshold voltages of all selected memory cells are higher than the target level, the verify operation may be processed as 'PASS' in step S64.

In step S64, when the verify operation is processed as 'FAIL', a level of the program voltage Vpgm to be used in a next program loop may be increased (S65), and step S61 may be performed again using the highly reset program voltage Vpgm. When step S61 is performed again, since the memory cells of which the threshold voltage is increased to the target level in the previous program loop are changed to the inhibit cells, the number of bit lines to which the program prohibit voltage is applied may increase and the number of bit lines to which the program allowable voltage is applied may decrease.

Steps S61 to S65 may be repeatedly performed until step S64 is passed.

When step S64 is passed, a step of determining whether the selected page is a last page may be performed (S66). Since the plurality of pages may be included in the selected memory block and the program operation is performed in units of the selected page, step S66 may be a step of determining whether the program operation of all pages included in the selected memory block is completed. When the selected page is not the last page (No), a next page may be selected (S67), and steps S61 to S67 may be repeated until the selected page becomes the last page in step S66 (Yes).

When the selected page is determined to be the last page in step S66 (Yes), the program operation of the selected memory block may be ended.

Figure 7:
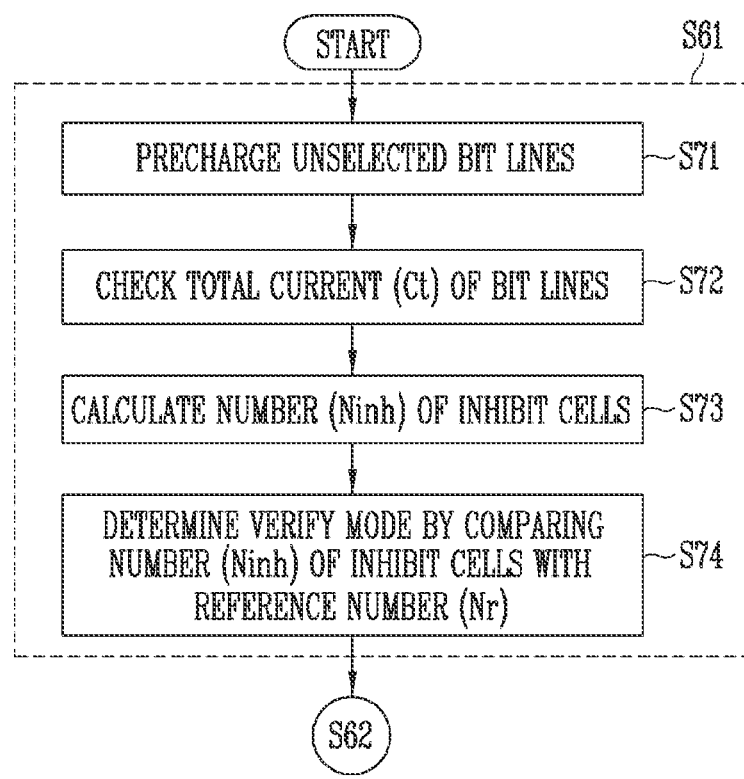
FIG. 7 is a flowchart specifically illustrating a bit line setup step according to an embodiment of the present disclosure.

FIG. 7 is a flowchart specifically illustrating a bit line setup step according to an embodiment of the present disclosure.

Referring to FIGS. 6 and 7, when the bit line setup step (S61) is started, a step of precharging unselected bit lines may be performed (S71). In step S71, the unselected bit lines are the bit lines connected to the inhibit cells. For example, the unselected bit lines may be precharged with the program inhibit voltage, and the program allowable voltage may be applied to the selected bit lines connected to the selected memory cells. Since the program inhibit voltage or the program allowable voltage are described with reference to FIG. 6, an overlapping description is omitted.

Since the program inhibit voltage is applied to the unselected bit lines, a current may flow in the unselected bit lines. Accordingly, a step of checking the total current value Ct of the bit lines may be performed (S72). Since a current flows in the unselected bit lines connected to the inhibit cells, among the bit lines, the total current value Ct may be the sum of the currents measured in each of the unselected bit lines connected to the inhibit cells.

Subsequently, the number Ninh of inhibit cells may be calculated based on the total current value Ct of the bit lines (S73). Since the total current value Ct of the bit lines increases as the number of inhibit cells increases, the number Ninh of inhibit cells may be calculated even though the number of inhibit cells is not directly counted during the program operation. That is, the number Ninh of inhibit cells calculated in step S73 may be a value estimated from the total current value Ct.

For example, since the number of memory cells on which the program operation is completed is relatively small during an initial period of the program operation of the selected page, the number Ninh of inhibit cells may be relatively small. The number Ninh of inhibit cells being small may mean that the number of unselected bit lines is small. Since the fact that the number of unselected bit lines is small means that the number of bit lines to which the program inhibit voltage is applied is small, the total current value Ct of the bit lines may be smaller during the initial period of the program operation compared to that of a latter period of the program operation. Therefore, the fact that the total current value Ct of the bit lines is smaller may mean that the number Ninh of inhibit cells is smaller.

For example, since the number of memory cells on which the program operation is completed is greater during the latter period of the program operation of the selected page compared to that during the initial period of the program operation, the number Ninh of inhibit cells may be relatively large. Since the number Ninh of inhibit cells being large means that the number of unselected bit lines is greater than that of the initial period of the program operation, the total current value Ct of the bit lines may increase towards the latter period of the program operation. Therefore, an increase in the total current value Ct of the bit lines may mean an increase in the number Ninh of inhibit cells.

As described above, when the total current value Ct of the bit lines is checked, a calculation operation for calculating the number Ninh of inhibit cells may be performed based on the total current value Ct of the bit lines (S73).

When the number Ninh of inhibit cells is calculated, an operation for determining the verify mode by comparing the number Ninh of inhibit cells with a reference number Nr may be performed (S74). The verify mode may be determined to be the blind mode or the normal mode, and when the verify mode is determined, step S62 may be performed.

Figure 8:
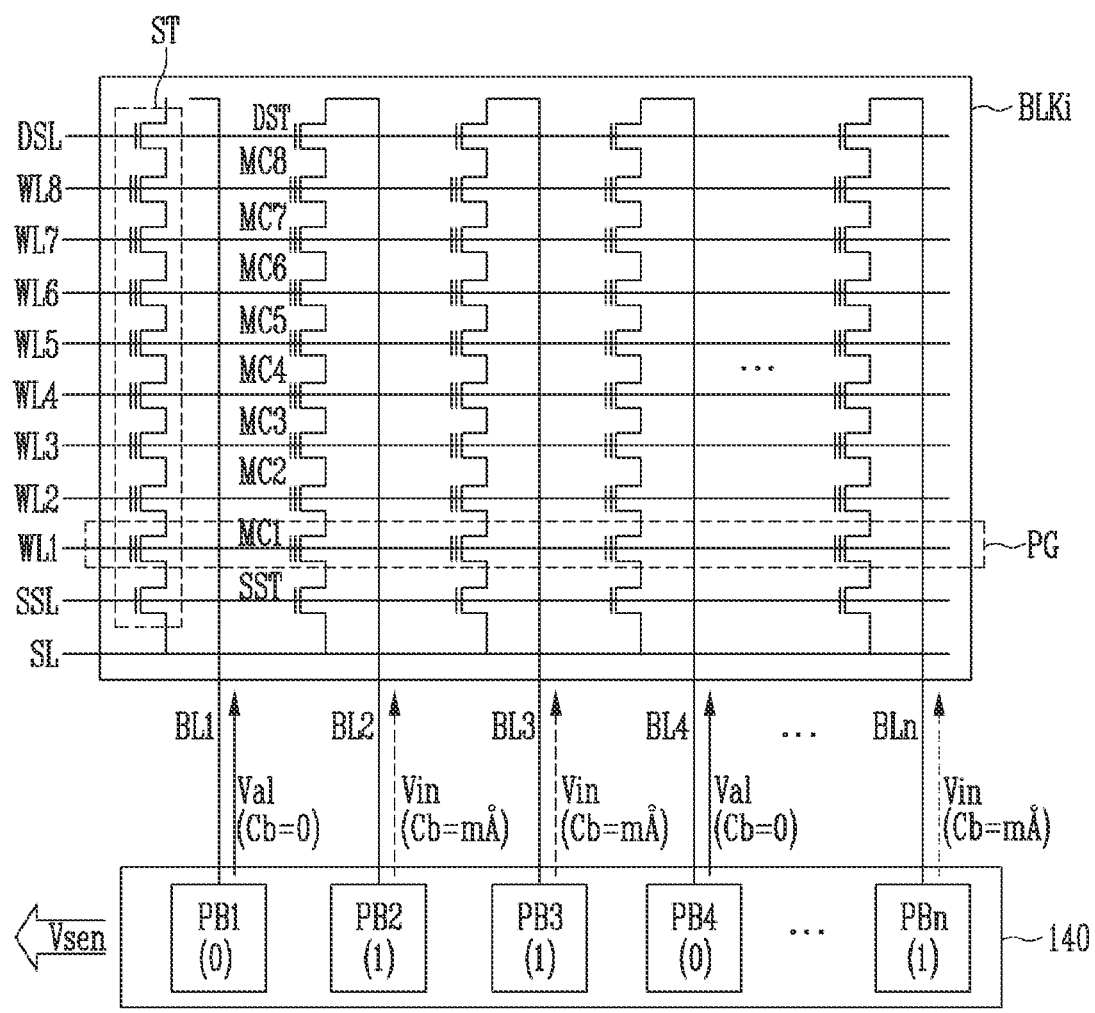
FIG. 8 is a diagram illustrating a method of measuring a current value of bit lines.

FIG. 8 is a diagram illustrating a method of measuring a current value of the bit lines.

Referring to FIG. 8, when the first memory block BLK1 is the selected memory block and the first to n-th bit lines BL1 to BLn are connected to the first memory block BLK1, first to n-th page buffers PB1 to PBn corresponding to the number of bit lines may be included in the page buffer group 140. When data 0 is set to program data and data 1 is set to non-program data, a program allowable voltage Val may be applied to the bit lines BL1, BL4, . . . connected to the page buffers PB1, PB4, . . . where the program data 0 is stored. At this time, a program inhibit voltage Vin may be applied to the bit lines BL2, BL3, . . . , and BLn connected to the page buffers PB2, PB3, . . . , and PBn where the non-program data 1 is stored. The program allowable voltage Val may be 0V, and the program inhibit voltage Vin may be a positive voltage that is higher than 0V. Therefore, a level of the sensing voltage Vsen sensed by the first to n-th page buffers PB1 to PBn may be determined according to the number of bit lines precharged with the program inhibit voltage Vin. An operation of outputting the sensing voltage Vsen may be simultaneously performed when the bit lines BL2, BL3, . . . , and BLn may be precharged with the program inhibit voltage Vin. Alternatively, the operation of outputting the sensing voltage Vsen may be performed between an operation of precharging the bit lines BL2, BL3, . . . , and BLn with the program inhibit voltage Vin and an operation of applying the program voltage to the selected word line.

Figure 9:
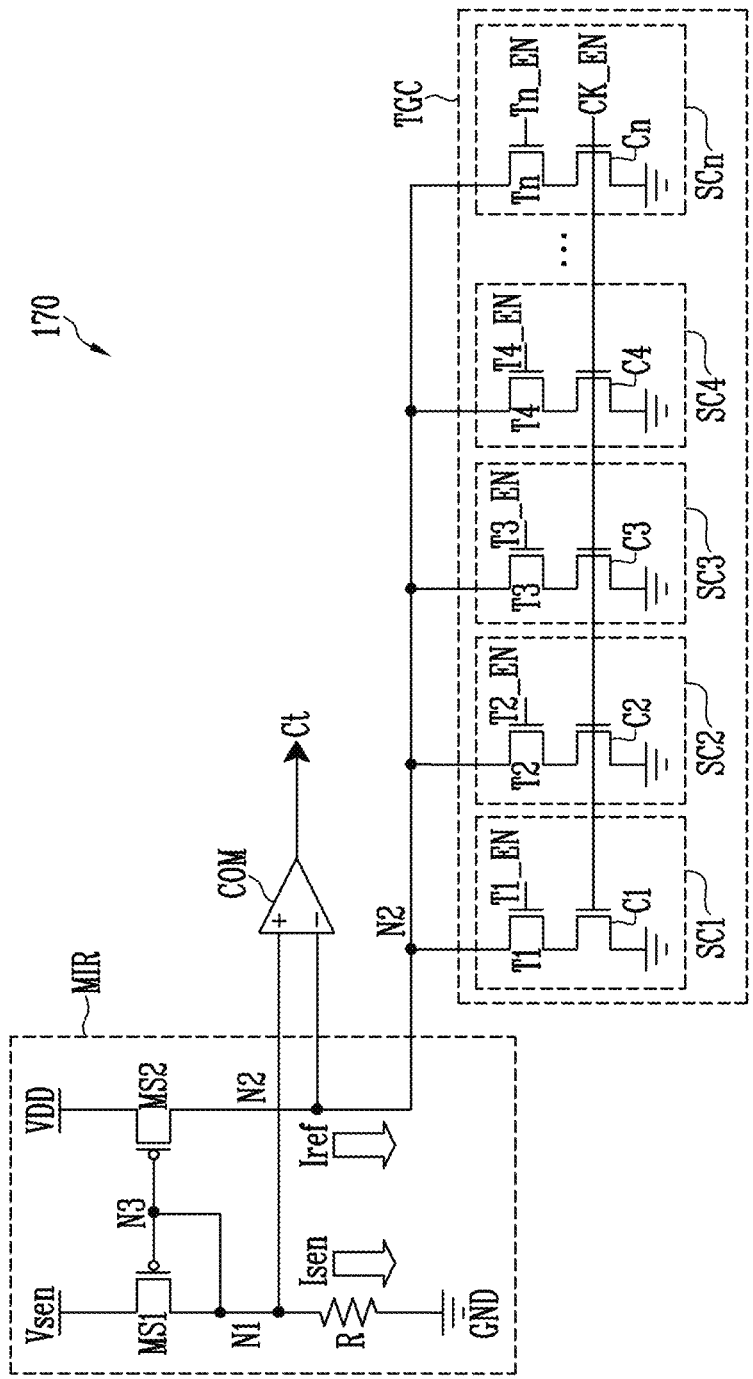
FIG. 9 is a diagram illustrating a current meter.

FIG. 9 is a diagram illustrating the current meter.

Referring to FIG. 9, the current meter 170 may include a mirror circuit MIR, a targeting circuit TGC, and a comparator COM to output the total current value Ct according to the sensing voltage Vsen received from the page buffers.

The mirror circuit MIR may be configured to generate a sensing current Isen according to the sensing voltage Vsen and generate a reference current Iref according to a power voltage VDD. For example, the mirror circuit MIR may include first and second mirror switches MS1 and MS2. The first mirror switch MS1 may be implemented with a PMOS transistor connected between a terminal to which the sensing voltage Vsen is applied and a first node N1. The first node N1 may be connected to a ground terminal GND through a register R. The second mirror switch MS2 may be implemented with a PMOS transistor connected between a terminal to which the power voltage VDD is applied and a second node N2. Gates of the first and second mirror switches MS1 and MS2 may be commonly connected to a third node N3. The third node N3 may be connected to the first node N1.

The targeting circuit TGC may include first to n-th sub-circuits SC1 to SCn connected to the second node N2 in parallel. Each of the first to n-th sub-circuits SC1 to SCn may be configured identically to each other.

Referring to the first sub-circuit SC1 as an example, the first sub-circuit SC1 may include a first targeting switch T1 and a first check switch C1 connected in series between the second node N2 and the ground terminal GND. The first targeting switch T1 may be implemented with an NMOS transistor connected between the second node N2 and the first check switch C1. The first targeting switch T1_EN may be turned on or off in response to a first targeting enable signal T1_EN. The first targeting enable signal T1_EN may be activated during an operation of programming the selected memory cells to the first program state. For example, in the operation of programming the selected memory cells to the first program state, the first targeting enable signal T1_EN may be activated to a positive voltage.

Referring to the n-th sub-circuit SCn as an example, the n-th sub-circuit SCn may include an n-th targeting switch Tn and an n-th check switch Cn connected in series between the second node N2 and the ground terminal GND. The n-th targeting switch Tn may be implemented with an NMOS transistor connected between the second node N2 and the n-th check switch Cn. The n-th targeting switch Tn_EN may be turned on or off in response to an n-th targeting enable signal Tn_EN. The n-th targeting enable signal Tn_EN may be activated during an operation of programming the selected memory cells to the n-th program state. For example, in the operation of programming the selected memory cells to the n-th program state, the n-th targeting enable signal Tn_EN may be activated to a positive voltage.

First to n-th targeting enable signals T1_EN to Tn_EN applied to first to n-th targeting switches T1 to Tn may be selectively activated to vary the reference current Iref according to a target voltage of the selected memory cells. For example, in an operation in which the selected memory cells are programmed to the second or third program state, the second targeting enable signal T2_EN corresponding to the second program state and the third targeting enable signal T3_EN corresponding to the third program state may be activated. At this time, the remaining targeting enable signals may be inactivated. The check enable signal CK_EN may be commonly applied to first to n-th check switches C1 to Cn. The check enable signal CK_EN may be activated in a step of determining the verify mode and may be deactivated in other steps. The check enable signal CK_EN may be activated when a voltage is positive and inactivated when the voltage is 0V or negative.

Therefore, the first sub-circuit SC1 may be activated when both of the check enable signal CK_EN and the first targeting enable signal T1_EN are activated and may be inactivated when at least one of the check enable signal CK_EN and the first targeting enable signal T1_EN is inactivated. Since the number of current paths increases as the number of activated circuits, among the first to n-th sub-circuits SC1 to SCn, increases, the reference current Iref may be proportional to the number of activated circuits, among the first to n-th sub-circuits SC1 to SCn.

The comparator COM may compare the sensing current Isen flowing through the first node N1 and the reference current Iref flowing through the second node N2 and may output the total current value Ct of the bit lines according to a comparison result. For example, the first node N1 may be connected to a plus (+) input terminal of the comparator COM, and the second node N2 may be connected to a minus (−) input terminal of the comparator COM. The comparator COM may increase the total current value Ct of the bit lines when the sensing current Isen is greater than the reference current Iref and may decrease the total current value Ct of the bit lines when the sensing current Isen is equal to or less than the reference current Iref.

Figure 10:
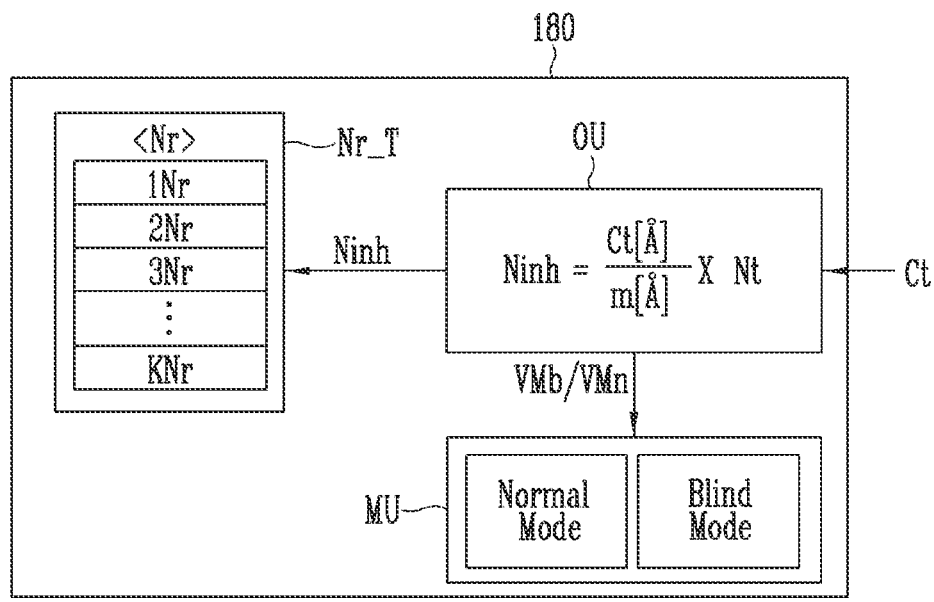
FIG. 10 is a diagram illustrating a logic circuit.
Figure 11:
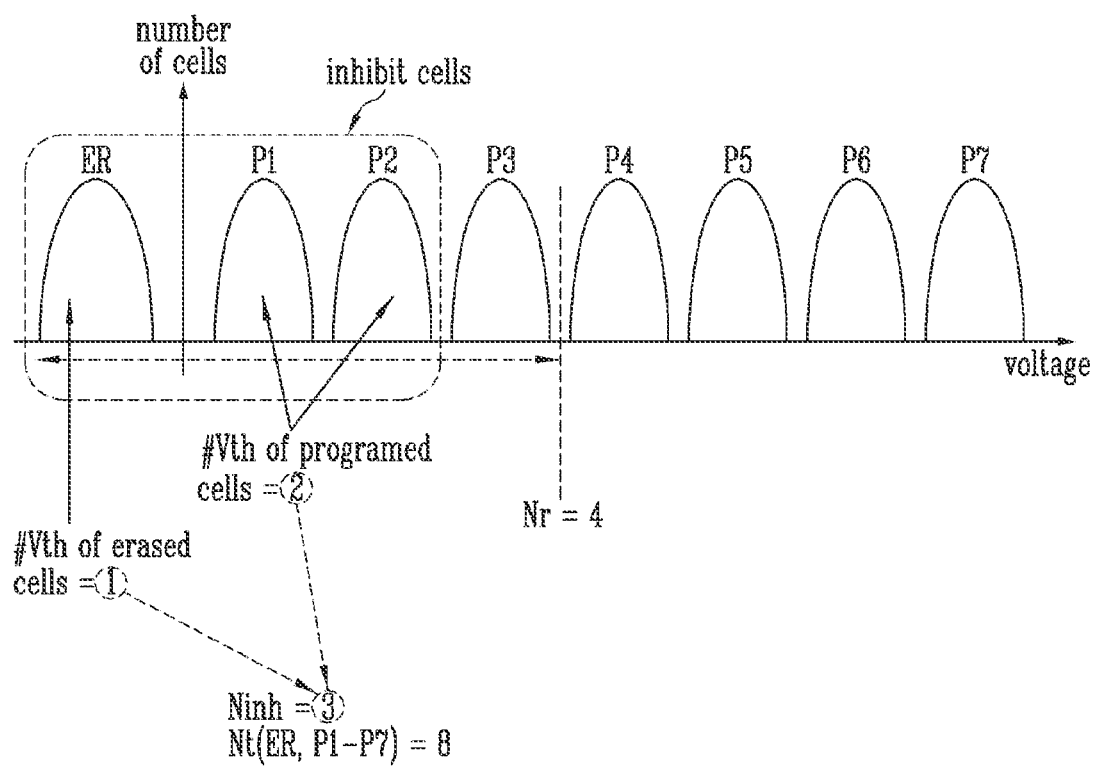
FIG. 11 is a diagram illustrating the number of inhibit cells.

FIG. 10 is a diagram illustrating the logic circuit, and FIG. 11 is a diagram illustrating the number of inhibit cells.

Referring to FIGS. 10 and 11, the logic circuit 180 may include an operating component OU (or an operation unit), a reference number table Nr_T, and a mode determiner MU (or a mode decision unit). The operating component OU may receive the total current value Ct of the bit lines and may calculate the number Ninh of inhibit cells according to the received total current value Ct. For example, the operating component OU may calculate the number Ninh of inhibit cells by performing a calculation operation according to Equation 1.

$$Ninh=(Ct/m) \times Nt \qquad \text{[Equation 1]}$$

In Equation 1, Ct is the total current value of the bit lines, and m is the current flowing through the bit line connected to the inhibit cell. A unit of Ct, and m may be Å. A value of m may be a previously measured value during a test operation of the memory device and may be a fixed constant. Nt may be a positive integer and may be a total number of states that the memory cells may have. For example, in a case of the triple level cell, since the memory cells may be programmed to one erase state and seven program states, a value of Nt may be 8. Therefore, the value of Nt may be changed according to a program method set in the memory device.

When the number Ninh of inhibit cells is calculated, the operating component OU may generate the number Ninh of inhibit cells and may compare the reference number Nr corresponding to the number Ninh of inhibit cells in the reference number table Nr_T and the number Ninh of inhibit cells. For example, reference numbers 1Nr to KNr corresponding to each of the target voltages may be stored in the reference number table Nr_T. In other words, the reference numbers 1Nr to KNr may be set to a maximum number of inhibit cells corresponding to each of the program loops.

The operating component OU may select the reference number Nr corresponding to the target voltage of the programmed memory cells and may compare the number Ninh of inhibit cells calculated as a result of the calculation with the reference number Nr. Subsequently, the operating component OU may output a blind mode signal VMb or a normal mode signal VMn according to a comparison result between the number Ninh of inhibit cells and the reference number Nr. For example, the operating component OU may output the blind mode signal VMb as a mode signal when the number Ninh of inhibit cells is equal to or less than the reference number Nr and may output the normal mode signal VMn as the mode signal when the number Ninh of inhibit cells is greater than the reference number Nr. Here, the reference number Nr may be changed according to the program loop or the program voltage.

The mode determiner MU may determine the verify mode according to the blind mode signal VMb or the normal mode signal VMn. For example, the mode determiner MU may set the verify operation to the blind mode in response to the blind mode signal VMb or set the verify operation to the normal mode in response to the normal mode signal VMn.

The logic circuit 180 may control the peripheral circuit to perform the blind verify operation or the normal verify operation according to the verify mode set by the mode determiner MU.

Referring to FIG. 11, it is assumed that the reference number Nr of the program loops in which the memory cells may be programmed to the third program state P3 is 4. At this time, when the number Ninh of inhibit cells calculated according to the total current value Ct of the bit lines is 3 the memory cells included in the selected page may be determined to be the slow cells since cells programmed to the third program state P3 among the memory cells included in the selected page do not exist. In this case, the blind mode signal VMb may be output from the reference number table Nr_T. According to the blind mode signal VMb, a verify operation using a third verify voltage between the second and third program states P2 and P3 may be omitted in a current program loop, and verify operations using a first or second verify voltage may be performed according to a result of a verify operation performed in a previous program loop.

A method of outputting the verify mode signal VM by comparing the number Ninh of inhibit cells and the reference number Nr is specifically described as follows.

Figure 12:
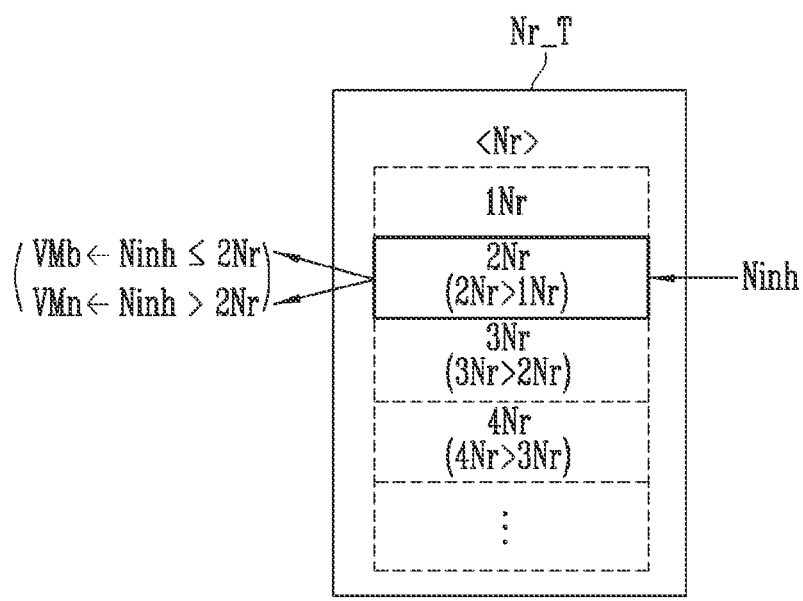
FIG. 12 is a diagram illustrating a method of outputting a mode signal according to the inhibit cells.

FIG. 12 is a diagram illustrating a method of outputting the mode signal according to the inhibit cells.

Referring to FIG. 12, the operating component OU may select the reference number Nr corresponding to a currently selected program loop from the reference number table Nr_T according to the number Ninh of inhibit cells. For example, a second reference number 2Nr may be greater than a first reference number 1Nr, and a third reference number 3Nr may be greater than the second reference number 2Nr. Subsequently, the operating component OU may compare the selected reference number Nr with the number Ninh of inhibit cells and may output the blind mode signal VMb or the normal mode signal VMn according to a comparison result. For example, it is assumed that the reference number Nr corresponding to the current program loop may be the second reference number 2Nr. The operating component OU may output the blind mode signal VMb when the number Ninh of inhibit cells is equal to or less than the second reference number 2Nr and may output the normal mode signal VMn when the number Ninh of inhibit cells is greater than the second reference number 2Nr.

Figure 13A:
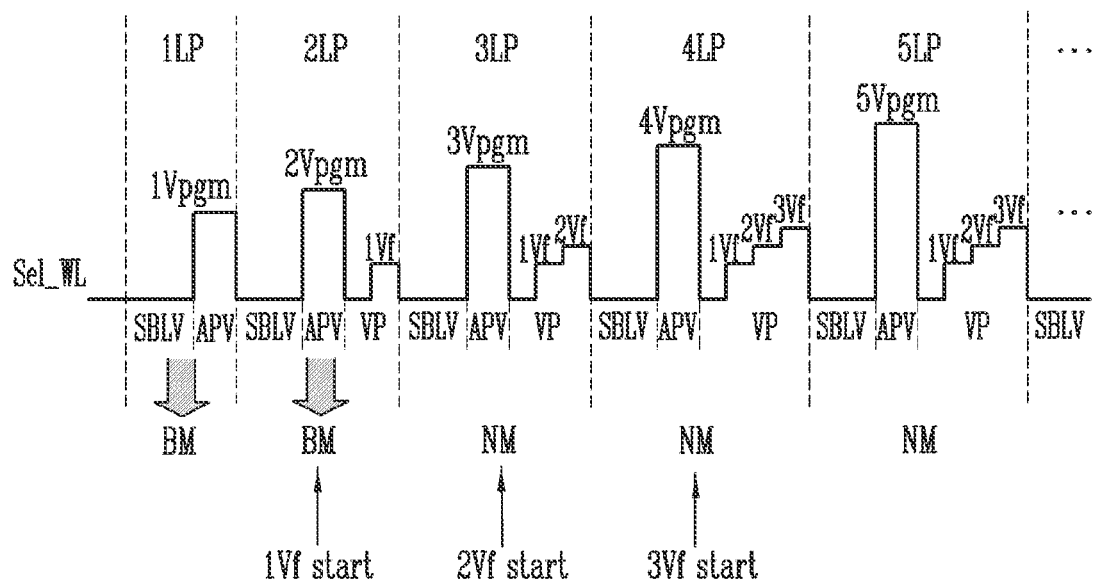
FIG. 13A is a diagram illustrating a blind mode according to the related art.
Figures 13B, 14A:
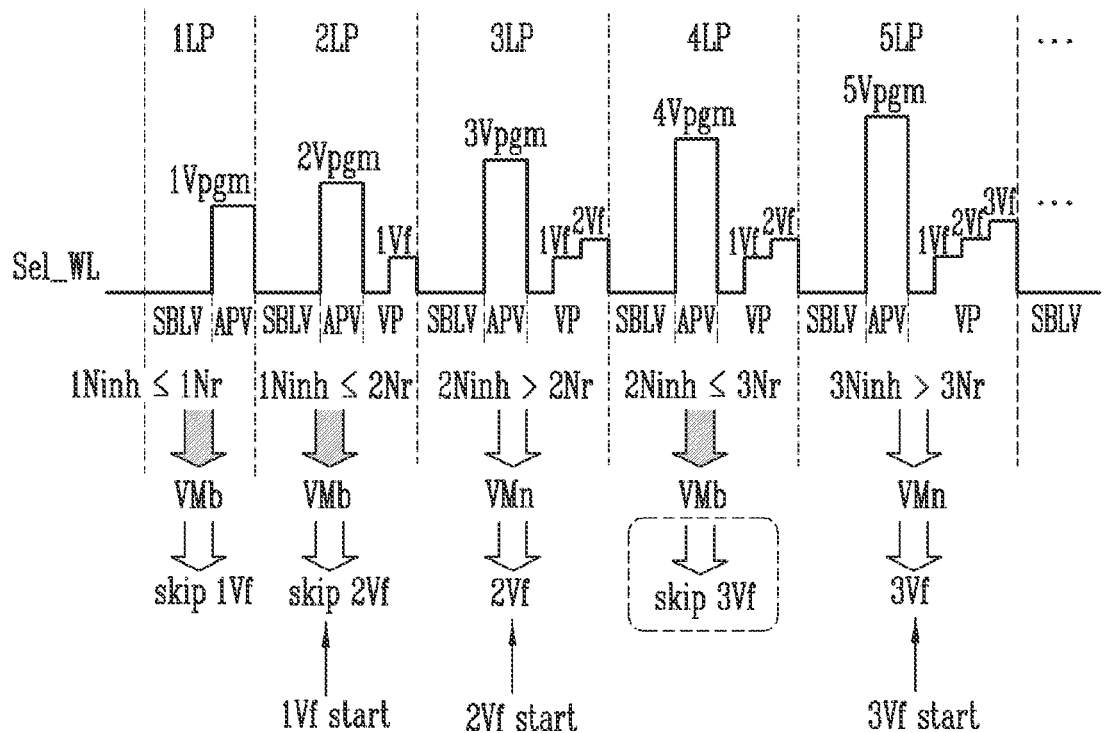
FIG. 13B is a diagram illustrating the blind mode according to the present disclosure.
FIGS. 14A and 14B are diagrams for comparing verify operations performed in a fast chip and a slow chip.

FIG. 13A is a diagram illustrating the blind mode according to the related art, and FIG. 13B is a diagram illustrating the blind mode according to the present disclosure.

Referring to FIG. 13A, according to the related art, the blind mode BM may be designated according to the program loop. Therefore, among all program loops 1LP to 5LP, . . . , only some program loops at the beginning may be performed in the blind mode BM, and the remaining program loops may be performed in the normal mode NM. For example, when the first and second program loops 1LP and 2LP are designated as the blind mode BM, a verify operation using a first verify voltage 1Vf may be omitted in the first program loop 1LP. In this case, in the first program loop 1LP, only the bit line setup step SBLV and the program voltage apply step APV may be performed, and the verify step VP may be omitted. In the second program loop 2LP, a verify operation using the first verify voltage 1Vf may be performed, and a verify operation using a second verify voltage 2Vf may be omitted. For example, in the second program loop 2LP, the bit line setup step SBLV, the program voltage apply step APV, and the verify step VP may be performed. In the verify step VP performed in the second program loop 2LP, the verify operation using the second verify voltage 2Vf may be omitted according to the blind mode BM. The omitted verify operation in the program loop in which the blind mode BM is designated may vary according to the program loop. When the blind mode BM is not designated in program loops performed after the second program loop 2LP, the program loops may be performed regardless of the program speed of the memory cells of the selected page. That is, even though the slow cells are included in the selected page, a program operation time may increase because the verify operation on the slow cells is performed.

Referring to FIG. 13B, since the blind mode is determined in each of the program loops in the present embodiment, the blind mode may be flexibly changed according to the program speed of the memory cells of the selected page. For example, according to the present embodiment, the number of inhibit cells may be determined in the current program loop, and the blind mode may be determined according to the number of inhibit cells. The number of inhibit cells may be calculated according to the total current value of the bit lines measured in the bit line setup step SBLV of the current program loop. Since the method of calculating the number Ninh of inhibit cells according to the total current value of the bit lines is described with reference to FIG. 10, an overlapping description is omitted.

When the first reference number 1Nr is set in the first program loop 1LP and the first number 1Ninh of inhibit cells is calculated in the bit line setup step SBLV, the operating component OU of FIG. 9 may compare the first number 1Ninh of inhibit cells with the first reference number 1Nr. For example, when it is determined that the first number 1Ninh of inhibit cells is equal to or less than the first reference number 1Nr, the operating component OU may output the blind mode signal VMb so that the verify operation using the first verify voltage 1Vf is omitted in the first program loop 1LP.

When the second reference number 2Nr is set in the second program loop 2LP and the first number 1Ninh of inhibit cells is calculated in the bit line setup step SBLV, the operating component OU may compare the first number 1Ninh of inhibit cells with the second reference number 2Nr. For example, when it is determined that the first number 1Ninh of inhibit cells is equal to or less than the second reference number 2Nr, the operating component OU may output the blind mode signal VMb so that the verify operation using the second verify voltage 2Vf is omitted in the second program loop 2LP. At this time, the verify operation using the first verify voltage 1Vf may be selectively performed in the second program loop 2LP. For example, the second program loop 2LP may be set to perform the verify operation using the first verify voltage 1Vf regardless of the number of inhibit cells. When the verify operation using the first verify voltage 1Vf is started, in program loops performed thereafter, the verify operation using the first verify voltage 1Vf may be repeatedly performed until the verify operation using the first verify voltage 1Vf is passed. Alternatively, the second program loop 2LP may be set to compare the first number 1Ninh of inhibit cells with the first reference number 1Nr to determine whether to omit the verify operation using the first verify voltage 1Vf. That is, the first number 1Ninh of inhibit cells calculated in the second program loop 2LP may be compared with each of the first reference number 1Nr and the second reference number 2Nr, and omission of each of the verify operation using the first verify voltage 1Vf and the verify operation using the second verify voltage 2Vf may be determined according to a comparison result.

The second reference number 2Nr may also be set in the third program loop 3LP, and when the second number 2Ninh of inhibit cells greater than the first number 1Ninh of inhibit cells is calculated in the bit line setup step SBLV, the operating component OU may compare the second number 2Ninh of inhibit cells with the second reference number 2Nr. When the second number 2Ninh of inhibit cells is greater than the second reference number 2Nr, the operation unit OU may output the normal mode signal VMn so that the verify operation using the second verify voltage 2Vf is performed in the third program loop 3LP.

In the fourth program loop 4LP, it may be determined whether to omit a verify operation using a third verify voltage 3Vf. For example, when the second number 2Ninh of inhibit cells is calculated in the bit line setup step SBLV of the fourth program loop 4LP, the operating component OU may compare the second number 2Ninh of inhibit cells with the third reference number 3Nr. The third reference number 3Nr may be a reference number set in the fourth program loop 4LP to determine whether to omit the verify operation using the third verify voltage 3Vf. For example, when the second number 2Ninh of inhibit cells is equal to or less than the third reference number 3Nr, the operating component OU may output the blind mode signal VMb so that the verify operation using the third verify voltage 3Vf is omitted in the fourth program loop 4LP. Therefore, even though the verify operations using the first and second verify voltages 1Vf and 2Vf are performed in the verify step VP of the fourth program loop 4LP, the verify operation using the third verify voltage 3Vf may be omitted. In the related art described with reference to FIG. 13A, since the verify operations using the first to third verify voltages 1Vf to 3Vf may be further performed in the third program loop 3LP, a program operation time of the present embodiment described with reference to FIG. 13B may be reduced.

The third reference number 3Nr may be set in the fifth program loop 5LP, and when the third number 3Ninh of inhibit cells greater than the second number 2Ninh of inhibit cells is set in the bit line setup step SBLV, the operating component OU may compare the third number 3Ninh of inhibit cells with the third reference number 3Nr. When the third number 3Ninh of inhibit cells is greater than the third reference number 3Nr, the operation unit OU may output the normal mode signal VMn so that the verify operation using the third verify voltage 3Vf is omitted in the fifth program loop 5LP.

In the method described above, also in the remaining program loops, the number of inhibit cells may be calculated according to the total current value of the bit line measured in the bit line setup step SBLV, and the blind mode for omitting a partial verify operation may be performed by comparing the calculated number of inhibit cells with the reference number.

Figures 14B, 15:
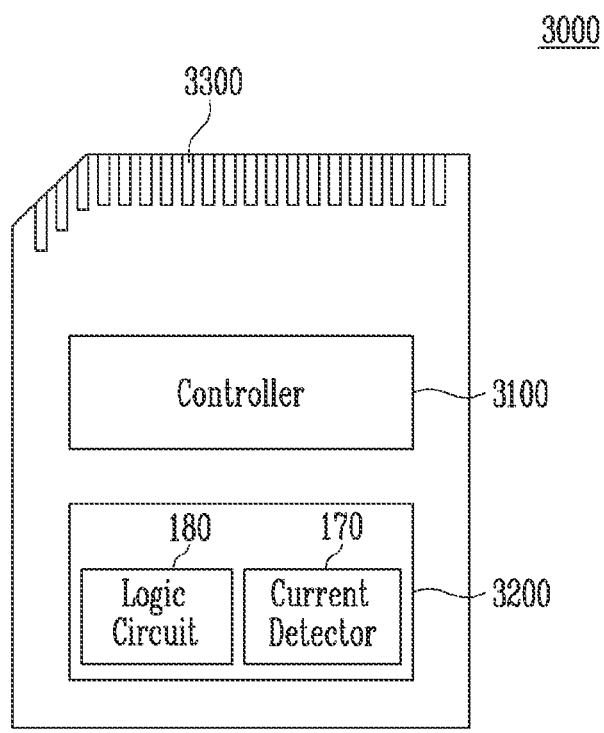
FIG. 15 is a diagram illustrating a memory card system to which a memory device according to an embodiment of the present disclosure is applied.

FIGS. 14A and 14B are diagrams for comparing verify operations performed in a fast chip and a slow chip.

Referring to FIGS. 14A and 14B, assuming that the first to eighth program loops 1LP to 8LP are performed in the program operation of the selected page, the reference number compared with the number of inhibit cells may be changed when the number of program loops changes. In FIGS. 14A and 14B, '0' may mean that the verify operation is performed. For example, in a case in which '0' exists in a portion in which 1LP and P1 overlap, the diagram of FIG. 14A shows that a verify operation for verifying the first program state P1 is performed in the first program loop 1LP. For example, in a case in which '0' exists in a portion in which 4LP and P1 overlap and 4LP and P2 overlap, the diagram of FIG. 14A shows that verify operations for verifying each of the first and second program states P1 and P2 are performed in the fourth program loop 4LP.

FIG. 14A shows the verify operation of the fast chip including the fast cells having the relatively fast program speed, and FIG. 14B shows the verify operation of the slow chip including the slow cells having the relatively slow program speed. In a case of the fast chip, since the threshold voltage of the memory cells increase quickly during the program operation, the number of program loops to which the blind period is applied may be less than that of the slow chip.

In other words, when comparing verify operations performed in the same program loop, the number of verify operations performed in the fast chip may be greater than the number of verify operations performed in the slow chip. For example, from the first program loop 1LP to the third program loop 3LP, the number of verify operations performed in the fast chip and the slow chip may be the same, and a difference may occur in the number of verify operations from the fourth program loop 4LP. For example, in the fast chip and the slow chip, while the first to third program loops 1LP to 3LP are performed, only a verify operation for verifying the first program state P1 may be performed, and verify operations for verifying the remaining second to fourth program states P2 to P4 may be omitted. When an operation speed of the fast chip and the slow chip occurs from the fourth program loop 4LP, the number of inhibit cells calculated in the fast chip may be greater than the number of inhibit cells calculated in the slow chip.

When a reference number corresponding to the second verify voltage is designated in the fourth and fifth program loops 4LP and 5LP, the verify operation using the second verify voltage may be performed from the fourth program loop 4LP in the fast chip, but the verify operation using the second verify voltage may be omitted even in the fourth and fifth program loops 4LP and 5LP in the slow chip (142). For example, in the slow chip, the verify operation using the second verify voltage may be performed from the sixth program loop 6LP.

When a reference number corresponding to the third verify voltage is designated in the sixth program loop 6LP, the verify operation using the third verify voltage may be performed from the sixth program loop 6LP in the fast chip (143), but the verify operation using the third verify voltage may be omitted even in the sixth program loop 6LP in the slow chip (144).

As described above, since the number of inhibit cells is calculated according to the total current value of the bit lines in each of the program loops, and whether to apply the blind mode is flexibly determined according to the number of inhibit cells, the number of verify operations may be reduced compared to performing the verify operation even in a program loop in which a blind condition is satisfied. Therefore, according to the present embodiment, a time required for the program operation may be reduced.

FIG. 15 is a diagram illustrating a memory card system to which a memory device according to an embodiment of the present disclosure is applied.

Referring to FIG. 15, the memory card system 3000 may include a controller 3100, a memory device 3200, and a connector 3300.

The controller 3100 may be connected to the memory device 3200. The controller 3100 may be configured to access the memory device 3200. For example, the controller 3100 may be configured to control a program, read, or erase operation of the memory device 3200 or to control a background operation. The controller 3100 may be configured to provide an interface between the memory device 3200 and a host. The controller 3100 may be configured to drive firmware for controlling the memory device 3200. For example, the controller 3100 may include components, such as a random access memory (RAM), a processing unit, a host interface, a memory interface, and an error correction circuit.

The controller 3100 may communicate with an external device through the connector 3300. The controller 3100 may communicate with an external device (for example, the host) according to a specific communication standard. For example, the controller 3100 may be configured to communicate with an external device through at least one of various communication standards, such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

The memory device 3200 may include memory cells and may be configured identically to the memory device 100 shown in FIG. 1. For example, the memory device 3200 may include the current meter 170 and the logic circuit 180. As in the above-described embodiment, the current meter 170 may be configured to output the total current value of the bit lines according to the sensing voltage measured from the bit lines. During the program operation, the logic circuit 180 may calculate the number of inhibit cells by performing the calculation operation using the total current value that is output from the current meter 170 and may determine the verify mode to be the blind verify mode or the normal verify mode according to the calculated number.

The controller 3100 and the memory device 3200 may be integrated into one semiconductor device to configure a memory card. For example, the controller 3100 and the memory device 3200 may be integrated into one semiconductor device to configure a memory card, such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 16:
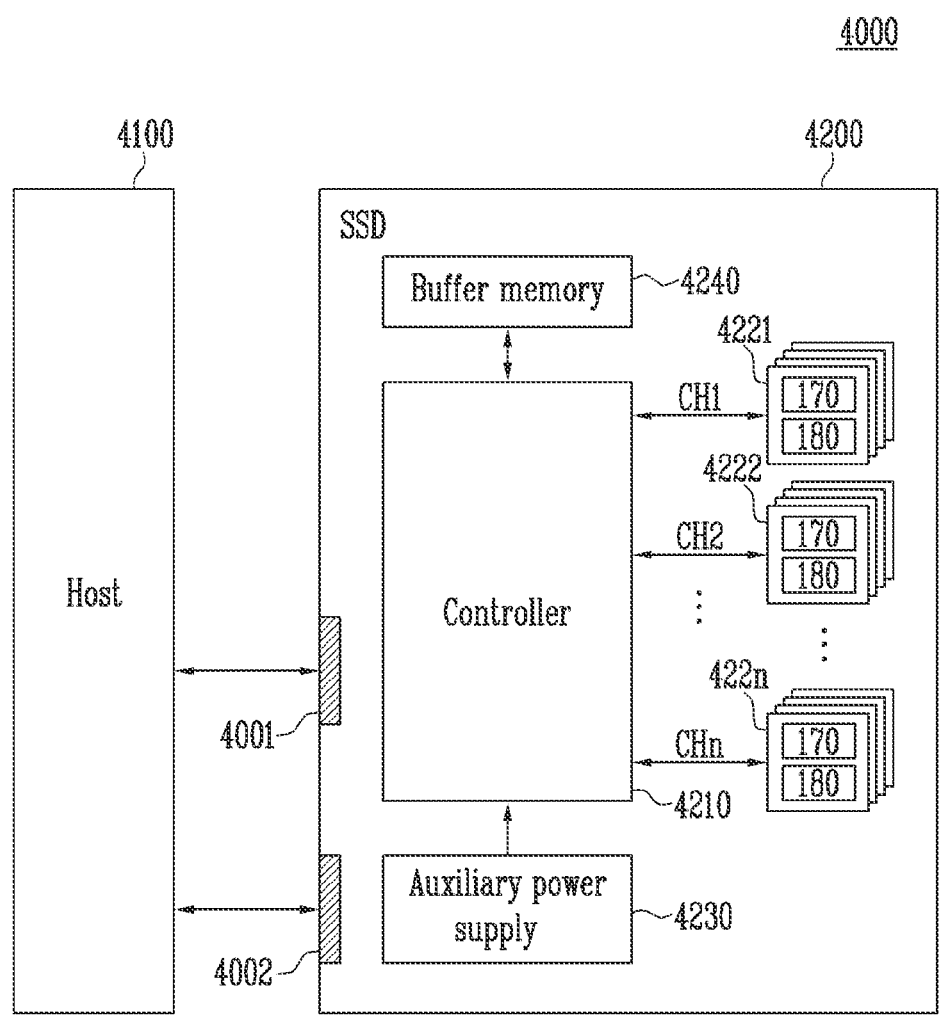
FIG. 16 is a diagram illustrating a solid state drive (SSD) system to which a memory device according to an embodiment of the present disclosure is applied.

FIG. 16 is a diagram illustrating a solid state drive (SSD) system to which a memory device according to an embodiment of the present disclosure is applied.

Referring to FIG. 16, the SSD system 4000 may include a host 4100 and an SSD 4200. The SSD 4200 may exchange a signal with the host 4100 through a signal connector 4001 and may receive power through a power connector 4002. The SSD 4200 may include a controller 4210, a plurality of memory devices 4221 to 422n, an auxiliary power supply 4230, and a buffer memory 4240.

The controller 4210 may control the plurality of memory devices 4221 to 422n in response to the signals received from the host 4100. For example, the signals may be signals based on an interface between the host 4100 and the SSD 4200. For example, the signals may be signals defined by at least one of interfaces, such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The plurality of memory devices 4221 to 422n may include memory cells capable of storing data. Each of the plurality of memory devices 4221 to 422n may be configured identically to the memory device 100, shown in FIG. 1. For example, each of the plurality of memory devices 4221 to 422n may include the current meter 170 and the logic circuit 180. As in the above-described embodiment, the current meter 170 may be configured to output the total current value of the bit lines according to the sensing voltage measured from the bit lines. During the program operation, the logic circuit 180 may calculate the number of inhibit cells by performing the calculation operation using the total current value that is output from the current meter 170 and may determine the verify mode to be the blind verify mode or the normal verify mode according to the calculated number.

The auxiliary power supply 4230 may be connected to the host 4100 through the power connector 4002. The auxiliary power supply 4230 may receive a power voltage from the host 4100 and charge the power voltage. The auxiliary power supply 4230 may provide a power voltage of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 may operate as a buffer memory of the SSD 4200. For example, the buffer memory 4240 may temporarily store data received from the host 4100 or data received from the plurality of memory devices 4221 to 422n, or may temporarily store data (for example, a mapping table) of the memory devices 4221 to 422n. The buffer memory 4240 may include a volatile memory, such as a DRAM, an SDRAM, a DDR SDRAM, and an LPDDR SDRAM, or a non-volatile memory such as an FRAM, a ReRAM, an STT-MRAM, and a PRAM.

What is claimed is:

1. A memory device comprising:
   a memory block including memory cells;
   a voltage generator connected to the memory cells through word lines and configured to apply a program voltage or a verify voltage to the word lines;
   a plurality of page buffers connected to the memory cells through a plurality of bit lines and configured to apply a program allowable voltage or a program inhibit voltage to the plurality of bit lines;
   a current measurer configured to output a total current value of the plurality of bit lines according to a sensing voltage measured from the plurality of bit lines; and
   a logic circuit configured to control the voltage generator and the page buffers to calculate a number of inhibit cells according to the total current value and configured to omit a verify operation of a program loop or perform the verify operation of the program loop according to the number of the inhibit cells.

2. The memory device of claim 1, wherein the page buffers are configured to apply the program inhibit voltage to bit lines connected to the inhibit cells, among the plurality of bit lines, and configured to apply the program allowable voltage to bit lines connected to cells other than the inhibit cells, among the plurality of bit lines.

3. The memory device of claim 2, wherein the program inhibit voltage is set to be higher than the program allowable voltage.

4. The memory device of claim 1, wherein the current measurer comprises:
   a mirror circuit configured to mirror a sensing current generated by the sensing voltage;
   a targeting circuit configured to change a reference current of the mirror circuit according to a target threshold voltage of the memory cells; and
   a comparator configured to output the total current value by comparing the sensing current with the reference current.

5. The memory device of claim 4, wherein the mirror circuit comprises:
   a first mirror switch connected between a terminal to which the sensing voltage is applied and a first node; and
   a second mirror switch connected between a terminal to which a power voltage is applied and a second node, the second mirror switch sharing a gate line with the first mirror switch.

6. The memory device of claim 5, wherein the first and second mirror switches are implemented with PMOS transistors.

7. The memory device of claim 5, wherein the targeting circuit includes sub-circuits connected in parallel to the second node that is between the second mirror switch and the sub-circuits.

8. The memory device of claim 7, wherein each of the sub-circuits includes a targeting switch and a check switch connected in series between the second node and the ground terminal.

9. The memory device of claim 8, wherein the targeting switch is connected between the second node and the check switch, and the targeting switch is implemented with an NMOS transistor that is turned on or off in response to a targeting enable signal.

10. The memory device of claim 9, wherein the targeting enable signal is selectively applied to the targeting switch included in each of the sub-circuits.

11. The memory device of claim 8, wherein the check switch is connected between the targeting switch and the ground terminal, and the check switch is implemented with NMOS transistor that is turned on or off in response to a check enable signal.

12. The memory device of claim 11, wherein the check switch included in each of the sub-circuits is simultaneously turned on or off in response to the check enable signal.

13. The memory device of claim 1, wherein the logic circuit comprises:
    a reference number table in which a plurality of reference numbers corresponding to target voltages are stored;
    an operating component configured to calculate the number of the inhibit cells according to the total current value and configured to output a blind mode signal or a normal mode signal by comparing the number of the inhibit cells with a selected reference number, among the plurality of reference numbers; and
    a mode determiner configured to set the verify operation to the blind mode in response to the blind mode signal or to set the verify operation to the normal mode in response to the normal mode signal.

14. The memory device of claim 13, wherein the operating component calculates a value by dividing the total current value by a current of one bit line to which the program inhibit voltage is applied and outputs the number of the inhibit cells by multiplying the value by a total number of threshold voltage distributions that the memory cells are able to have.

15. The memory device of claim 13, wherein the operating component outputs the blind mode signal when the number of the inhibit cells is equal to or less than the selected reference number and outputs the normal mode signal when the number of the inhibit cells is greater than the selected reference number.

16. A method of operating a memory device, the method comprising:
applying a program allowable voltage to first bit lines connected to selected memory cells and applying a program inhibit voltage to second bit lines connected to inhibit cells;
measuring a total current value of the first and second bit lines;
determining a verify mode according to the total current value;
applying a program voltage to a word line connected to the selected memory cells; and
performing or omitting a verify operation of the selected memory cells according to the verify mode.

17. The method of claim 16, wherein the program inhibit voltage is set to a positive voltage, and
wherein the program allowable voltage is set to a level that is lower than the program inhibit voltage.

18. The method of claim 16, wherein measuring the total current value and applying the program allowable voltage or the program inhibit voltage are performed simultaneously.

19. The method of claim 16, wherein measuring the total current value is performed after a predetermined time after the program inhibit voltage is applied to the second bit lines.

20. The method of claim 16, wherein determining the verify mode according to the total current value comprises:
calculating the number of the inhibit cells according to the total current value; and
determining the verify mode according to the number of the inhibit cells.

21. The method of claim 20, wherein calculating the number of the inhibit cells comprises:
calculating a value by dividing the total current value by a current of one bit line to which the program inhibit voltage is applied; and
outputting the number of the inhibit cells by multiplying the value by a total number of threshold voltage distributions that the memory cells are able to have.

22. The method of claim 20, wherein determining the verify mode comprises:
selecting a reference number corresponding to a current program loop from among a plurality of reference numbers corresponding to a plurality of program loops;
comparing the reference number with the number of the inhibit cells; and
determining the verify mode according to a comparison result between the reference number and the number of the inhibit cells.

23. The method of claim 22, wherein, in performing or omitting the verify operation, when the number of the inhibit cells is equal to or less than the reference number, the verify operation is omitted in the current program loop, and when the number of the inhibit cells is greater than the reference number, the verify operation is performed in the current program loop.

24. A method of operating a memory device, the method comprising:
precharging unselected bit lines, among the unselected bit lines and selected bit lines;
measuring a total current value of the unselected and selected bit lines;
calculating a value by dividing the total current value by a current flowing through one bit line, among the unselected bit lines; and
calculating the number of inhibit cells connected to the unselected bit lines by multiplying the value by a total number of threshold voltage distributions that memory cells are able to have.

25. The method of claim 24, further comprising:
after calculating the number of the inhibit cells, determining a blind period in which a verify operation is omitted based on the number of the inhibit cells.

26. The method of claim 25, in determining the blind period, when the number of inhibit cells is equal to or less than a reference number, the blind period is set, and when the number of the inhibit cells is greater than the reference number, the blind period is omitted.

* * * * *